United States Patent [19]

Fujita et al.

[11] Patent Number: 5,204,810
[45] Date of Patent: Apr. 20, 1993

[54] NC SENTENCE CREATION SYSTEM

[75] Inventors: Naoki Fujita, Hachioji; Teruyuki Matsumura, Tokyo; Noritake Nagashima, Yamato, all of Japan

[73] Assignee: Fanuc Ltd., Japan

[21] Appl. No.: 601,787

[22] PCT Filed: Mar. 6, 1989

[86] PCT No.: PCT/JP90/00293
§ 371 Date: Nov. 2, 1990
§ 102(e) Date: Nov. 2, 1990

[87] PCT Pub. No.: WO90/11559
PCT Pub. Date: Oct. 4, 1990

[30] Foreign Application Priority Data

Mar. 24, 1989 [JP] Japan .................... 1-72930

[51] Int. Cl.$^5$ ............ G06F 15/46; G05B 19/403
[52] U.S. Cl. ................ 364/191; 364/474.32; 364/474.33; 364/474.11; 408/3
[58] Field of Search ......... 364/474.32, 191, 474.33, 364/474.25, 474.22–474.24, 474.26–474.31, 474.11; 408/1 R, 3, 8–13; 318/567, 568.1, 571

[56] References Cited

U.S. PATENT DOCUMENTS

| | | | |
|---|---|---|---|
| 4,115,858 | 9/1978 | Kaufman | 364/474.32 |
| 4,604,705 | 8/1986 | Imanishi | 364/474.32 |
| 4,624,607 | 11/1986 | Kato et al. | 408/1 R |
| 4,698,573 | 10/1987 | Niwa | 364/474.33 |
| 4,704,689 | 11/1987 | Asakura | 408/3 |
| 4,723,203 | 2/1988 | Kishi et al. | 364/191 |

FOREIGN PATENT DOCUMENTS 2515378  4/1983  France .

Primary Examiner—Jerry Smith
Assistant Examiner—Steven R. Garland
Attorney, Agent, or Firm—Staas & Halsey

[57] ABSTRACT

Disclosed is a numerical control (NC) sentence creation system for creating an NC sentence for a two stage drilling operation by which a hole drilled by a first stage drilling operation is further drilled by a second stage drilling operation using a second drill having a smaller diameter, wherein machining configuration data are input (S1), machining condition data including a first amount of clearance and a second amount of clearance are input (S2, S3), and an NC sentence is created. The NC sentence enables the hole to be drilled in the first stage drilling operation and the second drill for the second stage drilling operation to be moved by a cutting feed from the bottom of the hole drilled by the first stage drilling operation to the machining end point of the second stage drilling operation (S4), whereby a machining time for the second stage drilling operation is shortened.

6 Claims, 5 Drawing Sheets

NC SENTENCE CREATION SYSTEM

BACKGROUND OF THE INVENTION

1. Field of the Invention

The present invention relates to an NC sentence creation system for creating an NC sentence for a two stage drilling operation, and more specifically, to an NC sentence creation system by which a machining time is shortened.

2. Background of the Related Art

FIG. 5 shows a tool feed operation when a two stage drilling operation is carried out by a numerically controlled machine tool using a conventional NC sentence First, a hole 32 is drilled to a workpiece 30 by a first stage drilling operation, then another not shown drill having a smaller diameter is moved by a quick traverse along a tool path 33a to the same point as that of the quick traverse stop point of the first stage drilling operation, i.e., to the point P30 which is spaced from the end 30a of a workpiece by an amount of clearance 131 and moved along a tool path 33b by a cutting feed to drill a hole 34.

Nevertheless, the drill does not make contact with the workpiece 30 from the point P30 to the bottom 32a of the hole 32 during the second stage drilling operation, and thus commanding the drill to be moved by the cutting feed speed in this area would be a waste of machining time.

DISCLOSURE OF THE INVENTION

Taking the above into consideration, an object of the present invention is to provide an NC sentence creation system by which a machining time can be shortened.

To solve the above problem, according to the present invention, there is provided an NC sentence creation system for creating an NC sentence for a two stage drilling operation by which a hole drilled by a first stage drilling operation using a first drill is further drilled by a second stage drilling operation using a second drill having a diameter smaller than that of the first drill, comprising inputting machining configuration data and machining condition data including a first amount of clearance and a second amount of clearance, and creating an NC sentence by which the first drill is moved to the machining end point of the first stage drilling operation by a cutting feed after same has been moved by a quick traverse to the point which is spaced from the end of a workpiece by the first amount of clearance when the first stage drilling operation is carried out, and the second drill is moved to the machining end point of the second stage drilling operation by a cutting feed after same has been moved by a quick traverse to the point which is spaced from the bottom of the hole drilled by the first stage drilling operation by the second amount of clearance, when the second stage drilling operation is carried out.

Cutting configuration data and cutting condition data including amounts of clearance are input to create an NC sentence by which the second drill is moved by a quick traverse to the vicinity of the bottom of the hole drilled by the first stage drilling operation when the second stage drilling operation is carried out.

DESCRIPTION OF THE PREFERRED EMBODIMENT

An embodiment of the present invention will be described below with reference to the drawings.

Figure 4:
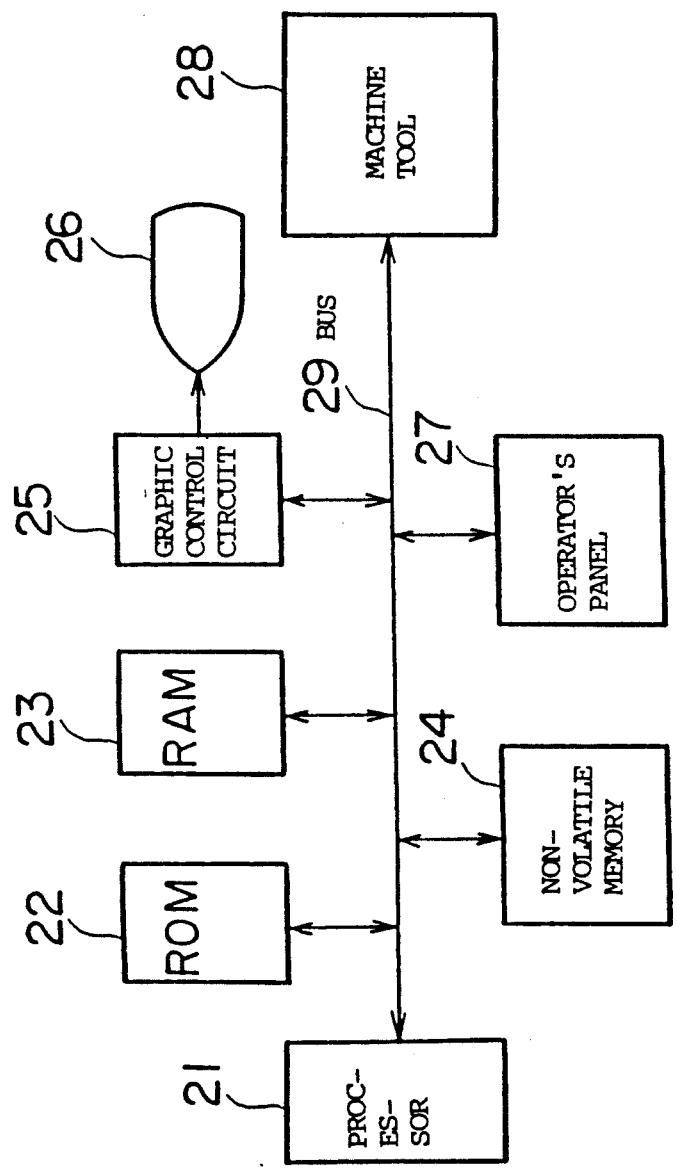
FIG. 4 is a diagram of a schematic arrangement of hardware of an interactive type numerical control apparatus for embodying the present invention.
Figure 5:
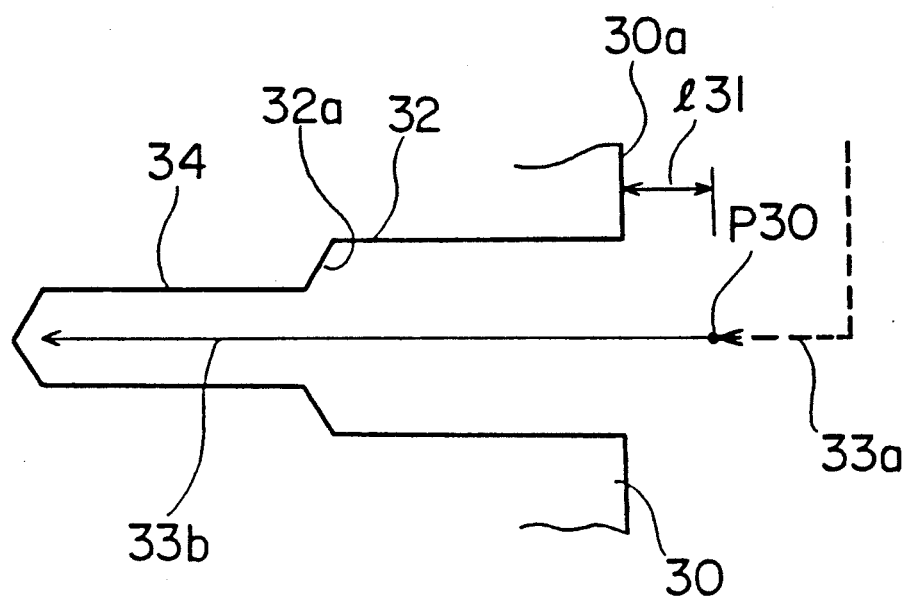
FIG. 5 is a diagram showing a tool feed operation carried out by a conventional NC sentence.

FIG. 4 is a diagram of a schematic arrangement of hardware of an interactive type numerical control apparatus for embodying the present invention. In FIG. 4, a processor 21 controls the operation of the interactive type numerical control apparatus as a whole in accordance with a system program stored in a ROM 22, which is an EPROM or EEPROM. A RAM 23 is composed of an SRAM in which various data or I/0 signals are stored, and a non-volatile memory 24 composed of a CMOS, which is supplied with power from a battery, stores parameters, amounts of pitch error correction, and machining configuration data and machining condition data to be described later which must be kept or stored even after the power supply thereto is cut off.

A graphic control circuit 25 converts digital signals into signals for display and supplies these signals to a display 26. A CRT or a liquid crystal display is used as the display 26 to display the position of each axis, the state of I/O signals, parameters, machining configurations and the like. An operator's panel 27 composed of a key-board and the like is used to interactively input various data and operates a machine tool 28. These components are interconnected through a bus 29.

Note that components such as an axis control circuit, servo amplifiers, spindle amplifiers, and a PMC (programmable machine controller) are not shown in the figure.

Figure 1:
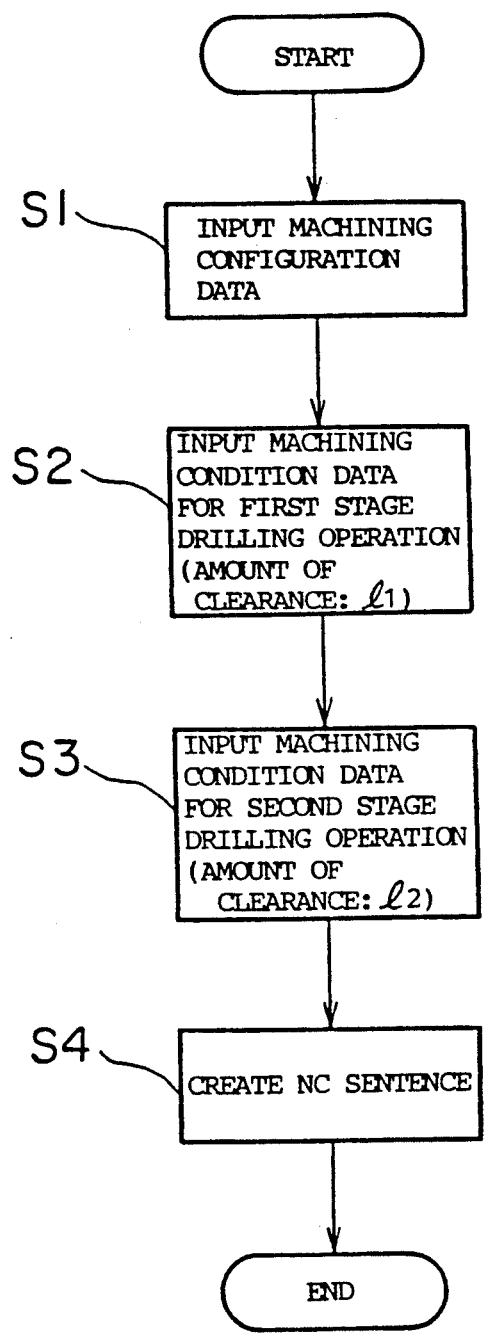
FIG. 1 is a flowchart of an NC sentence creation system of an embodiment of the present invention.

FIG. 1 is a flowchart of an NC sentence creation system of an embodiment of the present invention. The flowchart shows the NC sentence creation system for carrying out a two stage drilling operation by a lathe using the above interactive type numerical control apparatus, wherein numerals prefixed with an "S" indicate the numbers of the steps of the process.

The final machining configuration data are interactively input at step S1, and machining condition data for a first stage drilling operation are input at step S2. The machining condition data include cutting conditions such as clearance amounts, cutting amounts, a cutting feed speed, an rpm of a spindle and the like, and an ID number of tools. Note that the clearance amounts correspond to values of parameters, and thus when an operator selects a predetermined parameter, an amount of clearance corresponding to the parameter is automatically set.

Machining condition data for a second stage drilling operation are input at step S3. Here, an amount of clearance for the second stage drilling operation can be set independently of that for the first stage drilling operation. Then, at step S4, the NC sentence is created based on the respective data input at steps S1 to S3.

Figure 2:
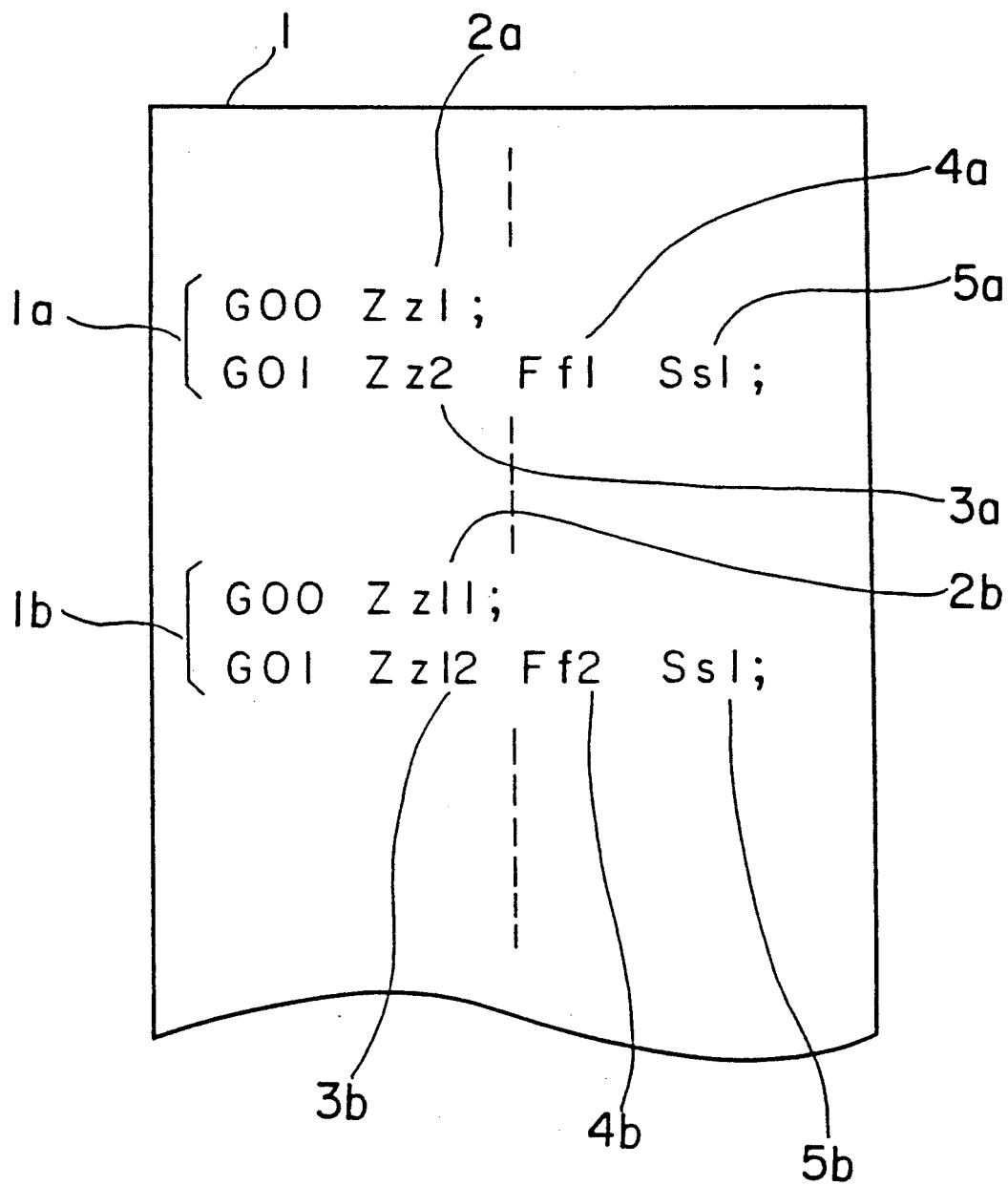
FIG. 2 is an NC program created by the NC sentence creation system of the embodiment of the present invention.

FIG. 2 shows an example of the NC sentence created by the NC sentence creation system of the embodiment of the present invention, wherein the respective values of a Z-axis 2a at a quick traverse stop point, a Z-axis 3a at a cutting feed stop point, a cutting feed speed 4a, and an rpm 5a of a spindle in an NC sentence 1a for the first stage drilling operation are automatically determined and created based on the input machining configuration data and machining condition data.

Similarly, in an NC sentence 1b for the second stage drilling operation, the respective values of a Z-axis 2b at a quick traverse stop point, a Z-axis 3b at a cutting feed stop point, a cutting feed speed 4b, and an rpm 5b of a spindle are also automatically determined and created based on the input machining configuration data and machining condition data.

Figure 3:
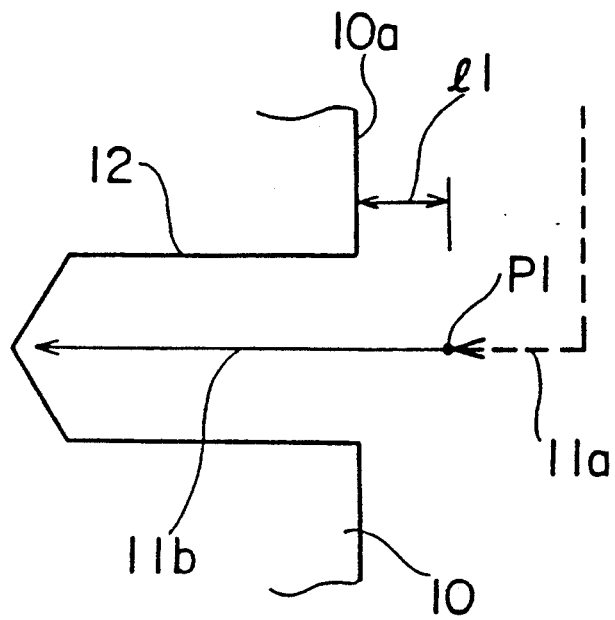
FIGS. 3(a) and 3(b) are diagrams showing a tool feed operation carried out by the NC sentence of FIG. 2.
Figure 3:
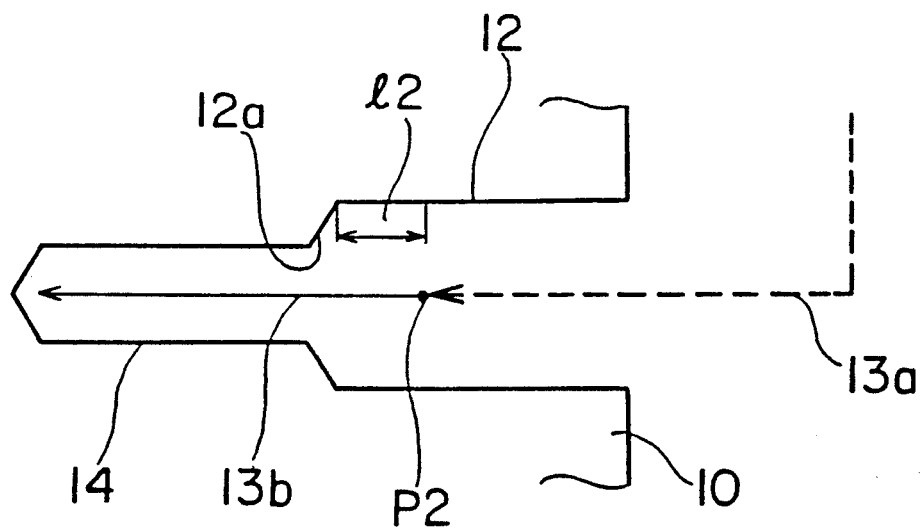

FIGS. 3(a) and 3(b) are diagrams showing a tool feed operation when the second stage drilling operation is carried out by the NC sentence 1 in FIG. 2. FIG. 3(a) shows a tool feed operation carried out in the first stage drilling operation, wherein a not shown first drill is moved by a quick traverse to the point P1 which is spaced from the end 10a of a workpiece by an amount of clearance l1 and then moved along a tool path 11b by a cutting feed to drill a hole 12.

FIG. 3(b) shows a tool feed operation carried out in the second stage drilling operation, wherein a not shown second drill having a diameter smaller than that of the first drill is moved by a quick traverse to a point P2 which is spaced from the shoulder portion 12a of the hole 12 by an amount of clearance l12 and then moved along a tool path 13b by a cutting feed to drill a hole 14. With this arrangement, when the second stage drilling operation is carried out, the second drill can be moved by the quick traverse to the vicinity of the bottom of the hole drilled by the first stage drilling operation.

Note that although the amounts of clearance are set by a parameter in the above description, a set value thereof can be arbitrarily changed while the programming is carried out.

Further, although an NC sentence for a drilling operation by a lathe is created in the above-described embodiment, the present invention is not limited to the lathe but can be also applied to a drilling operation by a machining center.

Furthermore, although the above embodiment employs an interactive type numerical control apparatus, the present invention is also applicable to an automatic programming apparatus.

As described above, according to the present invention, since machining configuration data and machining condition data including clearance amounts are input to create an NC sentence which enables the drill to be moved by the quick traverse to the vicinity of the bottom of the hole drilled by the first stage drilling operation when the second stage drilling operation is carried out, the machining time can be shortened.

In addition, since the clearance amounts are set by a parameter and set values thereof can be arbitrarily changed, the programming can be easily carried out.

We claim:

1. A numerical control sentence creation method implemented by a computer for creating a numerical control sentence for a two stage drilling operation by which a hole having a bottom drilled by a first stage drilling operation using a first drill having a first diameter is further drilled by a second stage drilling operation using a second drill having a second diameter smaller than the first diameter of the first drill, said numerical control sentence creation method comprising the steps of:

inputting and storing in a memory machining configuration data, and machining condition data including a first amount of clearance and a second amount of clearance; and creating the numerical control sentence for controlling said first and second drills using the computer, where said first drill is moved to a first machining end point of said first stage drilling operation by a predetermined first cutting feed after said first drill has been moved by a first quick traverse to a first point which is spaced from an end of a workpiece by said first amount of clearance when said first stage drilling operation is performed, and where said second drill is moved to a second machining end point of said second stage drilling operation by a predetermined second cutting feed after said second drill has been moved by a second quick traverse to a second point which is spaced from the bottom of the hole drilled by said first stage drilling operation by said second amount of clearance, when said second stage drilling operation is performed.

2. A numerical control sentence creation method according to claim 1, wherein said first amount of clearance and said second amount of clearance are parameters set by a program implemented by the computer.

3. A numerical control creation method according to claim 2, wherein said first and second amounts of clearance set by said program can be arbitrarily changed while said numerical control sentence creation method is implemented.

4. A numerical control sentence creation apparatus implemented by a computer for creating a numerical control sentence for a two stage drilling operation by which a hole having a bottom drilled by a first stage drilling operation using a first drill having a first diameter is further drilled by a second stage drilling operation using a second drill having a second diameter smaller than the first diameter of the first drill, said numerical control sentence creation apparatus comprising:

a memory storing machining configuration data, and machining condition data including a first amount of clearance and a second amount of clearance; and means for receiving said machining configuration and machining condition data and for creating the numerical control sentence used to control said first and second drills using the computer, where said first drill is moved to a first machining end point of said first stage drilling operation by a predetermined first cutting feed after said first drill has been moved by a first quick traverse to a first point which is spaced from an end of a workpiece by said first amount of clearance when said first stage drilling operation is performed, and where said second drill is moved to a second machining end point of said second stage drilling operation by a predetermined second cutting feed after said second drill has been moved by a second quick traverse to a second point which is spaced from the bottom of the hole drilled by said first stage drilling operation by said second amount of clearance, when said second stage drilling operation is performed.

5. A numerical control sentence creation apparatus according to claim 4, wherein said first amount of clearance and said second amount of clearance are parameters set by a program implemented by the computer.

6. A numerical control creation apparatus according to claim 5, wherein said first and second amounts of clearance set by said program can be arbitrarily changed while said numerical control sentence creation apparatus operates.

* * * * *

UNITED STATES PATENT AND TRADEMARK OFFICE
CERTIFICATE OF CORRECTION

PATENT NO. : 5,204,810
DATED : April 20, 1993
INVENTOR(S) : Fujita et al.

It is certified that error appears in the above-indentified patent and that said Letters Patent is hereby corrected as shown below:

Column 1, line 14, change "sentence" to --sentence.--;
    line 22, change "131" to --ℓ31--;
    line 31, change "disclosure" to --summary--.
Column 3, change line 21, "11" to --ℓ1--;
    line 28, change "112" to --ℓ2--.

Signed and Sealed this

Fourteenth Day of December, 1993

Attest:

BRUCE LEHMAN

*Attesting Officer*     *Commissioner of Patents and Trademarks*